United States Patent Office 3,589,979
Patented June 29, 1971

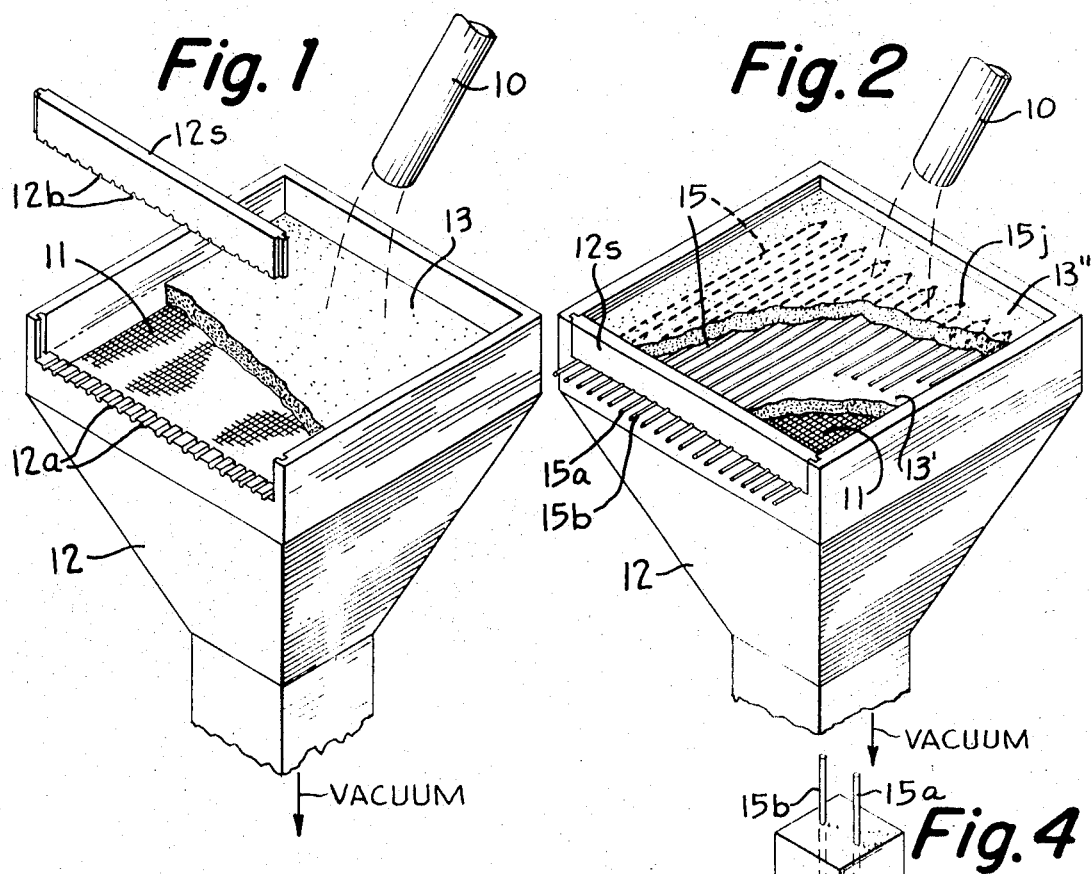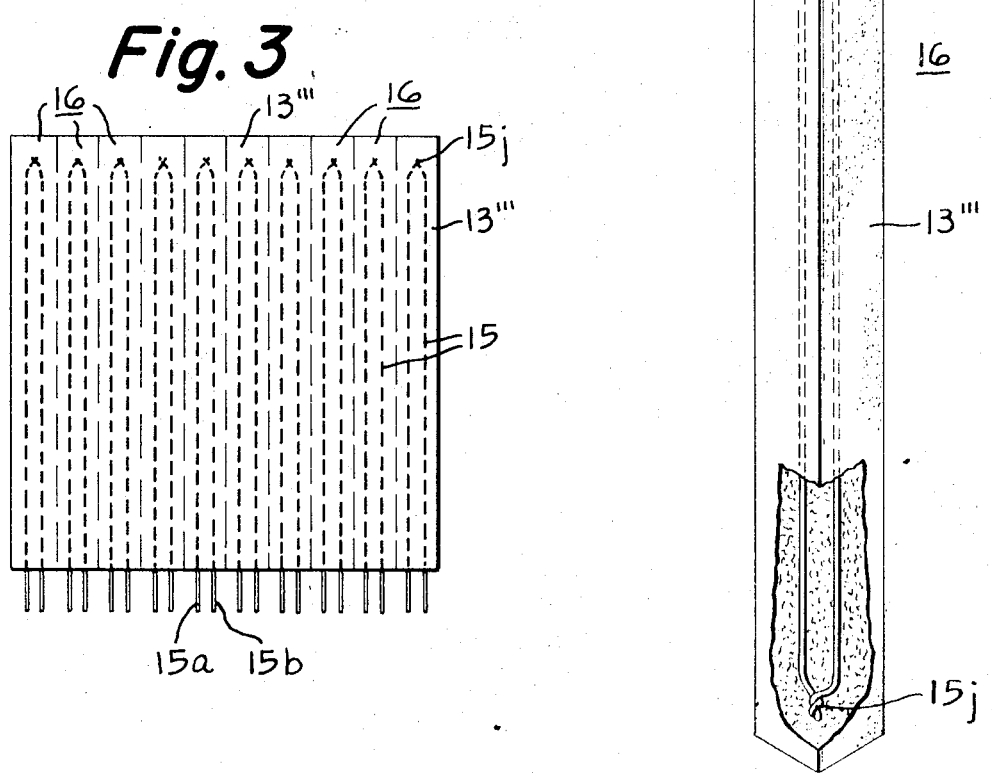

3,589,979
INSULATED HEAT SENSING ASSEMBLIES AND METHOD OF MAKING THE SAME
Donald I. Finch, North Woods, Glenside, and John R. Wiese, Dresher, Pa., assignors to Leeds & Northrup Company, Philadelphia, Pa.
Filed Aug. 10, 1967, Ser. No. 659,702
Int. Cl. B29j 5/00
U.S. Cl. 162—219       8 Claims

ABSTRACT OF THE DISCLOSURE

Fiber-insulated heat sensing assemblies such as insulated thermocouple assemblies and method of mass-producing the same using a liquid slurry containing fibers. A plurality of heat sensing devices, such as thermocouples, are positioned between layers of a slurry containing water, a binding agent, and fibers which may be of refractory material so that the electrical leads thereof desirably extend beyond the layers. The liquid is withdrawn from the layers of slurry to cause the fibers thereof to be intertwined with each other to form a composite blanket of densified fibers compacted around and between the leads and around the junction of each thermocouple. The composite blanket of fibers thus formed with thermocouple assemblies embedded therein is then severed into sections which result in individual felt insulated thermocouple assemblies.

FIELD OF THE INVENTION

This invention relates to insulated heat sensing assemblies, for example, of the thermocouple type, particularly suited for use in measuring the temperature of molten aluminum, zinc and the like.

DESCRIPTION OF THE PRIOR ART

In the past, thermocouples have been encased in refractory brick, woven glass type fabrics, silica-impregnated glass cloth layers, and glass or quartz. Additionally, thermoelectric materials have been deposited on a substrate in accordance with the desired pattern and thereafter the substrate sheared to provide individual thermocouples. It has also been proposed in the past to employ molded felt for embedding the hot junction of the thermocouple and a 2-hole ceramic insulator through which the legs of the thermocouple extend to a point exterior of the molded felt insulation for connection to a measuring instrument. While such prior art arrangements have proven satisfactory, at least to a reasonable extent, they have left something to be desired from the standpoint of mass production of a quality product and at a reasonable cost.

SUMMARY OF THE INVENTION

In accordance with the present invention, there is provided a plurality of heat sensing assemblies and improved method of making the same wherein a first layer of liquid slurry, including fibers which may be of refractory material, is applied over a surface area and thereafter a portion of the liquid from the area of slurry is withdrawn to provide a thickened layer of fibers. Heat sensing devices of the type, each having electrical leads for effecting an electrical connection in a measuring circuit, are disposed at spaced locations on the thickened slurry layer in such manner that the heat sensing devices are within the area while the free ends of the electrical leads extend beyond the area. A second layer of liquid slurry is applied over the thickened layer and the heat sensing devices positioned thereon so that the electrical leads and the heat sensing devices are completely surrounded by the fibers. Thereafter, the remainder of the excess liquid from all of the layers of slurry is withdrawn to cause the fibers of the layers to be intertwined with each other to form a composite blanket of densified fibers compacted around and between the electrical leads and the heat sensing devices of the heat sensing assemblies. Having compacted the layers of fibers into a composite blanket with the heat sensing devices and electrical leads embedded therein, the blanket is adapted to be severed into sections, which result in individual insulated heat sensing assemblies.

For further objects and advantages of the invention and for a more detailed disclosure thereof, reference is to be had to the following description taken in conjunction with the accompanying drawings.

BRIEF DESCRIPTION OF THE DRAWINGS

FIGS. 1 and 2 are perspective views diagrammatically illustrating the method of the present invention;

FIG. 3 is a top plan view of a plurality of insulated thermocouple assemblies produced in accordance with the method of the present invention; and FIG. 4 is a perspective view with a portion thereof broken away to more clearly illustrate one of the insulated thermocouple assemblies produced in accordance with the method of the present invention.

Referring to FIG. 1, it will be seen that in accordance with the present invention, liquid slurry, preferably comprising a mixture of suitable fibers, such as used in felt or paper, or, for higher temperature applications, refractory fibers such as asbestos, glass, alumina, silica, etc., or any mixtures thereof, and a suitable liquid comprised mostly of water and including a suitable binder material when desired is discharged from a supply pipe 10 onto a screen 11 supported near the upper end of a slurry box 12. The liquid slurry is adapted to form a first layer 13 of liquid slurry including fibers over the surface area of the screen 11. The area of the first layer 13 of liquid slurry will conform with the inside area of the uper end of the slurry box 12, and it is preferable that the layer of liquid slurry have a depth on screen 11 approximately level with the bottoms of the parallel grooves 12a extending along the front edge of the slurry box 12. The grooves or slots 12a are positioned in pairs and are adapted to receive the spaced wires of thermocouple assemblies or other heat sensing assemblies, as later to be described.

After the first layer 13 of liquid slurry has been placed on screen 11 in slurry box 12 in the manner illustrated in FIG. 1, a vacuum is produced by suitable suction means on the side of the screen 11 opposite of that on which the slurry layer 13 is distributed. The vacuum withdraws from the slurry layer 13 and through the screen 11 a portion of the liquid from the slurry layer 13, producing thereby a thickened slurry layer of fibers 13′, FIG. 2. As indicated in FIG. 1, the vacuum or suction is applied at the lower end of the slurry box 12.

After the desired amount of liquid has been removed from the first layer 13 of slurry, such layer is transformed into a densified slurry layer of fibers 13' which is thickened to the extent that it can support one or more thermocouples thereon. As may be seen in FIG. 2, the first layer of liquid slurry has been transformed into a densified or thickened layer 13' of fibers and a plurality of thermocouples 15 have been placed thereon in parallel relationship. Each of the thermocouples 15 comprises a pair of wires 15a, 15b of dissimilar metals joined at one of their ends to form a measuring or hot junction 15j and having the free ends of the wires 15a, 15b adapted to be received in the corresponding slots or grooves 12a in the slurry box 12. The slurry box 12 preferably is provided with a removable section 12s illustrated in FIG. 1 as having tongues at the opposite ends thereof to be received in the mating grooves in the slurry box 12. The lower edge of member 12s is provided with spaced pairs of grooves 12b which are adapted to mate with the corresponding grooves 12a in the slurry box 12. When the member 12s is assembled with the slurry box 12, as shown in FIG. 2, the free ends of the thermocouple wires 15a, 15b are disposed in the corresponding mating grooves 12a and 12b of the slurry box and extend outside of the area of the box 12 which is adapted to receive the liquid slurry. Thus, the free ends 15a, 15b of the thermocouples are not covered by the slurry and remain in uninsulated form.

With the parts assembled as illustrated in FIG. 2, a second layer of liquid slurry 13" is introduced into the slurry box 12 over the first thickened or densified slurry layer 13' and the thermocouples laid thereon, so that the individual wires and junctions of the thermocouples are intimately surrounded by the slurry. Suction is then applied to the side of the screen 11 opposite that side of the screen on which the slurry is distributed so that a major portion, substantially all, of the liquid of the slurry is removed and the fibers of the slurry are thereby intertwined and compacted around and between the wires and around the junction of the thermocouples. The layers of slurry 13' and 13" will unite to form a composite blanket 13''' of densified fibers. Such densified fiber blanket 13''' having thermocouple assemblies 15 embedded therein in parallel relationship is illustrated in FIG. 3.

The thermocouple assembly blanket of FIG. 3 is adapted to be separated along the lines indicated by the light broken lines in FIG. 3. Such separation may take place by cutting or any other suitable method. FIG. 4 illustrates a complete felt insulated thermocouple assembly 16 after it has been separated from the blanket illustrated in FIG. 3.

Insulated thermocouple assemblies produced in accordance with the present invention have proven to be very satisfactory in operation and provide long life. For example, thermocouple assemblies comprised of felted alumina fibers produced in accordance with the present invention have been immersed continuously in molten aluminum at 1350° F. and the refractory fiber insulation surrounding the thermocouple has successfully protected the thermocouple from the molten aluminum for continuous periods in excess of 3000 hours. The life of such thermocouples produced in accordance with the present invention is many times greater than thermocouples having protection tubes made of cast iron where the normal life expectancy of the thermocouple is in the order of 8 to 500 hours' immersion in molten aluminum, depending upon the application.

While the present invention has been described in connection with thermocouples, it is to be understood that other types of heat sensing devices are adapted to this process. Such other types of heat sensing devices include resistance thermometers and thermistors and other equivalent heat sensing devices. The types of heat sensing devices will depend upon the temperatures to be encountered and the particular temperature measuring application, and the same is true for the type of fibers to be used in the liquid slurry to form the layer felt.

It is further to be understood that the term slurry is intended to include fibers and liquid mixes of such moisture content which may be termed doughs or pastes.

It is also to be understood that in addition to the thermocouple wires being embedded in the felt a stiffening rod or tube may be included.

While a preferred form of the invention has been described and illustrated, it is to be understood that further modifications thereof may be made within the scope of the appended claims.

What is claimed is:

1. A method of making insulated heat sensing assemblies comprising:
    applying a first layer of liquid slurry including fibers over a porous surface area,
    withdrawing a portion of the liquid from said area of said slurry to provide a thickened slurry layer of fibers,
    positioning on said thickened slurry layer of fibers at least one heat sensing device having electrical leads to provide an electrical connection in a measuring circuit, said heat sensing device being within said area near one edge thereof and said electrical leads extending across and beyond an edge opposite said one edge of said area,
    applying a second layer of the liquid slurry over said thickened layer and said heat sensing device positioned thereon so that said heat sensing device and the portion of said electrical leads within said area are completely and intimately surrounded by said fibers, and
    thereafter withdrawing the remainder of the excess of said liquid from all of said layers of slurry causing said fibers of said layers to be intertwined with each other to form a composite blanket of densified fibers compacted around and between said electrical leads and said heat sensing device of said heat sensing assembly.

2. A method according to claim 1 wherein the liquid is withdrawn from all of the layers of slurry by applying suction to the side of the porous surface area opposite from the slurry.

3. A method according to claim 1 wherein each said heat sensing device is a thermocouple comprising a pair of wires of dissimilar materials joined at one of their ends to form a measuring junction and having their other ends free, said junction being within said area near said one edge and said free ends extending beyond said opposite edge of said area so that the composite blanket of densified fibers is compacted around and between said wires and around said junction to produce insulated thermocouple assemblies.

4. A method according to claim 3 wherein a plurality of thermocouples are placed in predetermined spaced relation on said thickened slurry layer of fibers and said second layer of liquid slurry is applied over said plurality of thermocouples.

5. A method according to claim 4 including the step of separating the insulated thermocouple assemblies one from the other.

6. A method according to claim 5 wherein said insulated thermocouple assemblies are separated one from the other by severing the blanket of densified fiber material at locations between adjacent thermocouples.

7. A plurality of heat sensing assemblies comprising:
    a blanket of felted fibers of material having embedded therein a plurality of independent heat sensing devices disposed at spaced locations in the same plane transverse to the length of said blanket and each of said devices having a pair of electrical leads disposed in said same plane extending across and beyond one edge of said blanket for providing an electrical connection in a measuring circuit,
    said heat sensing devices being embedded in said blanket near an edge opposite said one edge thereof and portions of said electrical leads being embedded in said blanket and extending across and beyond said one edge of said blanket so that individual felt encased heat sensing assemblies may be cut from said blanket.

8. A plurality of heat sensing assemblies according to claim 7 wherein said heat sensing devices are thermocouples, each comprising a pair of wires of dissimilar materials joined at one of their ends to form a measuring junction and having their other ends free, said measuring junctions being embedded within said blanket near said edge opposite said one edge thereof and said free ends of said thermocouples extending across and projecting from said one edge of said blanket.

References Cited

UNITED STATES PATENTS

| | | | |
|---|---|---|---|
| 3,339,002 | 8/1967 | Pelanne | 136—233X |
| 1,865,152 | 6/1932 | Stuart | 162—105 |
| 2,870,689 | 1/1959 | Brennan | 162—124X |
| 2,666,370 | 1/1954 | Bachus | 162—268 |

S. LEON BASHORE, Primary Examiner

A. D'ANDREA, Assistant Examiner

U.S. Cl. X.R.

162—221, 231